United States Patent
Williams

(10) Patent No.: US 7,419,121 B2
(45) Date of Patent: Sep. 2, 2008

(54) INTEGRATED MOUNT DUCT FOR USE WITH AIRBORNE AUXILIARY POWER UNITS AND OTHER TURBOMACHINES

(75) Inventor: Nicholas A. Williams, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 124 days.

(21) Appl. No.: 11/010,038

(22) Filed: Dec. 9, 2004

(65) Prior Publication Data

US 2006/0144050 A1 Jul. 6, 2006

(51) Int. Cl.
*B64D 27/00* (2006.01)
*F02C 6/00* (2006.01)
*F16L 3/08* (2006.01)

(52) U.S. Cl. .................. 244/54; 244/53 R; 60/797; 248/555; 248/74.1; 137/15.1

(58) Field of Classification Search .............. 244/54, 244/53 B, 53 R, 1 N; 248/555–557, 60, 68.1, 248/69, 74.1, 74.2; 60/796, 797, 226.1, 226.2; 137/15.1; 415/220, 221, 213.1, 214.1, 215.1; 52/287.1, 288.1, 302.3
See application file for complete search history.

(56) References Cited

U.S. PATENT DOCUMENTS

| | | | |
|---|---|---|---|
| 1,680,369 A * | 8/1928 | Dugan | 295/514 |
| 1,723,012 A * | 8/1929 | Caminez | 248/557 |
| 2,579,619 A * | 12/1951 | Scott | 285/228 |
| 2,762,118 A * | 9/1956 | Shaw et al. | 29/521 |
| 2,804,095 A * | 8/1957 | Schauenburg | 138/107 |
| 3,352,114 A * | 11/1967 | Ward et al. | 60/262 |
| 3,809,340 A | 5/1974 | Dogly et al. | |
| 3,952,973 A * | 4/1976 | James | 244/54 |
| 3,979,087 A | 9/1976 | Boris et al. | |
| 4,098,527 A * | 7/1978 | Herbert et al. | 285/146.3 |
| 4,130,258 A | 12/1978 | Fox | |
| 4,249,758 A * | 2/1981 | Harris | 285/136.1 |
| 4,266,741 A * | 5/1981 | Murphy | 244/54 |
| 4,291,905 A * | 9/1981 | Schrock | 285/192 |
| 4,601,495 A * | 7/1986 | Webb | 285/112 |
| 4,620,729 A * | 11/1986 | Kauffman | 285/136.1 |
| 4,676,458 A | 6/1987 | Cohen | |
| 4,683,717 A | 8/1987 | Naud | |
| 4,767,087 A | 8/1988 | Combu | |
| 4,793,578 A | 12/1988 | Howard | |
| 4,930,815 A * | 6/1990 | Tuggler, Jr. | 285/142.1 |
| 4,961,847 A * | 10/1990 | Amr | 210/137 |
| 5,071,174 A * | 12/1991 | Griffin et al. | 285/148.12 |
| 5,183,223 A | 2/1993 | Comax | |
| 5,228,727 A * | 7/1993 | Tokutake et al. | 285/189 |
| 5,372,338 A | 12/1994 | Carlin et al. | |
| 5,443,229 A * | 8/1995 | 'Brien et al. | 244/54 |
| 5,522,515 A * | 6/1996 | Pech et al. | 212/175 |
| 5,806,792 A * | 9/1998 | Brossier et al. | 244/54 |

(Continued)

*Primary Examiner*—Michael R. Mansen
*Assistant Examiner*—Joshua J Michener
(74) *Attorney, Agent, or Firm*—Ingrassia, Fisher & Lorenz, P.C.

(57) ABSTRACT

An integrated mount duct includes a load ring for mounting a turbomachine to a flight vehicle, wherein the load ring has a cylindrical shape with a flange edge and a stepped edge, and comprises one or more mechanical attachment members disposed on an outside surface of the load ring, the mechanical attachment members configured to mate with a strut.

11 Claims, 8 Drawing Sheets

U.S. PATENT DOCUMENTS

| | | | |
|---|---|---|---|
| 5,967,567 A * | 10/1999 | Nordstrom | 285/139.1 |
| 6,224,332 B1 * | 5/2001 | Leach et al. | 415/126 |
| 6,401,448 B1 * | 6/2002 | Manteiga et al. | 60/226.1 |
| 6,413,043 B1 * | 7/2002 | Bouyer | 415/159 |
| 6,419,535 B1 * | 7/2002 | Herrera | 440/77 |
| 6,491,168 B1 * | 12/2002 | Lutz et al. | 210/402 |
| 6,612,620 B1 * | 9/2003 | Nordstrom et al. | 285/139.1 |

* cited by examiner

INTEGRATED MOUNT DUCT FOR USE WITH AIRBORNE AUXILIARY POWER UNITS AND OTHER TURBOMACHINES

BACKGROUND OF THE INVENTION

The present invention generally relates to airborne ancillary turbomachinery, and in particular to a method and device for mounting such equipment to flight vehicle structures.

A typical flight vehicle, such as an aircraft, may include a turbomachine such as an Auxiliary Power Unit (APU) 10, partially shown in FIG. 1, used to provide electrical and pneumatic power to various parts of the aircraft (not shown) for environmental control, interior lighting, electronic power, and starting a main engine.

The conventional APU 10 may be mounted to the aircraft by means of struts or links attached to an APU gearbox pad 19. As shown in FIG. 2, a standard cloverleaf strut mounting assembly 11 (here shown in an exploded view) may include a finger mount 13, a stud adapter 23, a first vibration isolator 27, and a second vibration isolator 29. The stud adapter 23 may be removably attached to the conventional APU 10, typically by using mechanical fasteners. The finger mount 13 may be configured for removable attachment to proximate ends of a strut 15 and a strut 17. The distal ends of the struts 15 and 17 may be secured to the aircraft so as to provide support to the conventional APU 10.

A cloverleaf 21 may be configured to bear against the APU gearbox pad 19 and to mate with the stud adapter 23. The finger mount 13 may be mechanically secured to a stud 25 on the stud adapter 23 with a first vibration isolator 27 provided between the finger mount 13 and the stud adapter 23, and a second vibration isolator 29 and a washer 31 under a nut 33 threaded onto the stud 25.

Because there are a large number of flight vehicles currently in worldwide service which make use of the above standard cloverleaf strut mounting assembly 11 to install ancillary equipment, there exists a large, worldwide manufacturing base producing the standard mounting components. The relatively low cost and ready availability of these mounting components makes it desirable, when designing new ancillary aircraft equipment, to provide mounting pads compatible with the cloverleaf configuration. Accordingly, the present manufacturing base continues to produce the standard mounting components for new equipment as well as for the conventional equipment still in service.

Certain new ancillary equipment in the present state of the art is designed to be lighter and less costly, having fewer conventional hard pickup points for structural support and mounting. For example, a new auxiliary power unit may be designed without a gearbox to save weight and, consequently, would not have available a mounting surface, such as the APU gearbox pad 19, for attaching the standard mounting hardware. Such new equipment cannot utilize the standard mounting hardware and associated components described above, even though it remains economically feasible to continue using these components, even for new designs, and specialized mounting methods are used.

For example, an alternative mounting system is described in U.S. Pat. No. 5,183,223 issued to Cornax which discloses a first radial ring attached to an engine cowl and a second radial ring attached to an engine by a plurality of bolts. Outwardly extending tabs in the second ring mesh with grooves in the first ring to allow relative movement of the rings and thus provide for radial expansion as the engine heats up during operation. The mounting system disclosed by Cornax '223 is thus not compatible with standard mounting components.

U.S. Pat. No. 6,401,448 issued to Manteiga et al. discloses a system for mounting an aircraft engine which includes mounting features disposed on the engine, such as on the combustor casing. The mounting features may be attached to a mounting frame that is bolted to a pylon. However, the mounting system disclosed by Manteiga et al. '448 also includes specialized supporting struts and mounting features for securing the radial rings to the aircraft structure and does not utilize standard mounting components.

There continues to be a need for a mounting apparatus for mounting ancillary equipment to a vehicle, wherein the mounting apparatus is capable of using standard struts, cloverleaf mounting components, and finger attachments.

SUMMARY OF THE INVENTION

In one aspect of the present invention a load ring comprises a mount flange edge and a stepped edge, and includes a mechanical attachment member disposed on an outside surface of the load ring, the mechanical attachment member configured to mate with a stud adapter.

In another aspect of the present invention, an integrated mount duct comprises a load ring having a cylindrical shape and at least one mechanical attachment member disposed on an outside surface of the load ring, the mechanical attachment member configured to mate with a stud adapter; and an inlet duct attached to the load ring.

In another aspect of the present invention, an arc-shaped load ring bearing flange sector comprises: a mount flange edge configured to mate with a turbomachine enclosure component; a stepped edge configured to mate with an inlet duct; a first interlocking axial edge; a second interlocking axial edge; and a mechanical attachment member disposed on an outside surface of the load ring bearing flange sector, the mechanical attachment member configured to mate with a proximate end of a strut attached to a flight vehicle.

In a further aspect of the present invention, an arc-shaped load ring blank flange sector comprises: a mount flange edge configured to mate with a turbomachine enclosure component; a stepped edge configured to mate with an inlet duct; a first interlocking axial edge; and a second interlocking axial edge.

In still another aspect of the present invention, a sectored load ring comprises an arc-shaped ring bearing flange sector having a load ring pad; and a plurality of arc-shaped ring blank flange sectors.

In yet another aspect of the present invention, a sectored load ring comprises an arc-shaped lug flange sector having a lug enclosing a bearing; and a plurality of arc-shaped ring blank flange sectors.

In another aspect of the present invention, a sectored load ring comprises three arc-shaped ring pad flange sectors spaced at intervals of approximately 120°, each ring pad flange sector having a load ring pad configured to mate with a standard stud adapter, each ring pad flange sector further having a flange hole; and nine arc-shaped ring blank flange sectors disposed among the ring pad flange sectors, each ring blank flange sector having a flange hole.

In a further aspect of the present invention, a turbomachine suitable for mounting on a structure comprises a turbine; a strut mounting assembly; a strut having a proximal end connected to the strut mounting assembly and a distal end connected to the structure; a load ring having a cylindrical shape and at least one load ring pad disposed on an outside surface of the load ring, the load ring pad configured to mate with the strut mounting assembly; and an inlet duct enclosing the turbine, the inlet duct further attached to the load ring.

In yet another aspect of the present invention, a method of attaching a turbomachine to a structure comprises the steps of attaching a load ring to a turbomachine enclosure component, the load ring having a mount flange edge for mating with the enclosure component; providing at least one strut attached to the structure; and attaching the load ring to the structure using a strut mounting assembly attached to the strut, the load ring having at least one mechanical attachment member fastened to the strut mounting assembly.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention generally provides an apparatus and method for utilizing conventional cloverleaf strut mounting components with new airborne turbomachinery for mounting such new turbomachinery on a flight vehicle. In the present state of the art, the design specifications of new airborne turbomachinery preclude the use of such conventional cloverleaf strut mounting components.

In the present invention, a cylindrical load ring having a mount flange edge and having one or more mechanical attachment members, such as load ring pads, adapted for mounting components is attached at the mount flange edge to an enclosure component in the new turbomachine and is attached via the load ring pads to links or struts secured to the flight vehicle. The load ring pads may have a cloverleaf or a finger configuration so as to enable use of conventional strut mounting components with the turbomachinery attached to the cylindrical load ring.

Figure 3:
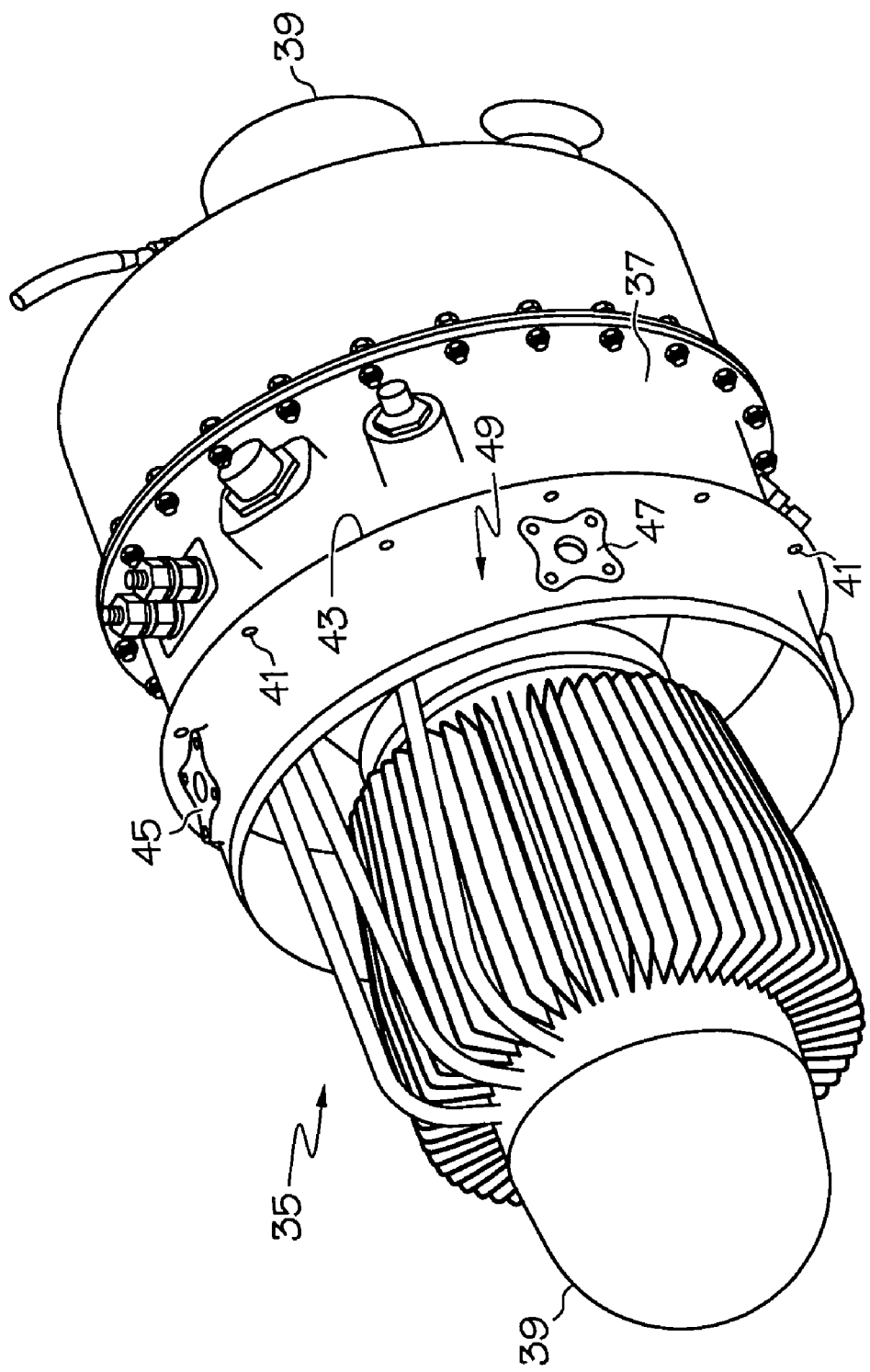
FIG. 3 is a perspective view of an auxiliary power unit secured to a load ring having cloverleaf mounting surfaces, according to the present invention.

There is shown in FIG. 3 a new auxiliary power unit 35 which lacks an integral gearbox, and thus the auxiliary power unit 35 includes no traditional gearbox mounting pads. The auxiliary power unit 35 may include a turbomachine, such as a turbine 39, disposed within a turbomachine enclosure component, such as an APU shroud 37. In accordance with the present invention, a cylindrical load ring 40 may be removably secured to a forward edge (not shown) of the APU shroud 37 with mechanical fasteners installed at a plurality of flange holes 41 disposed along the periphery of a mount flange edge 43 on the load ring 40, where the diameter of the mount flange edge 43 is larger than the diameter of an outboard load ring surface 49 of the load ring 40.

Figure 4:
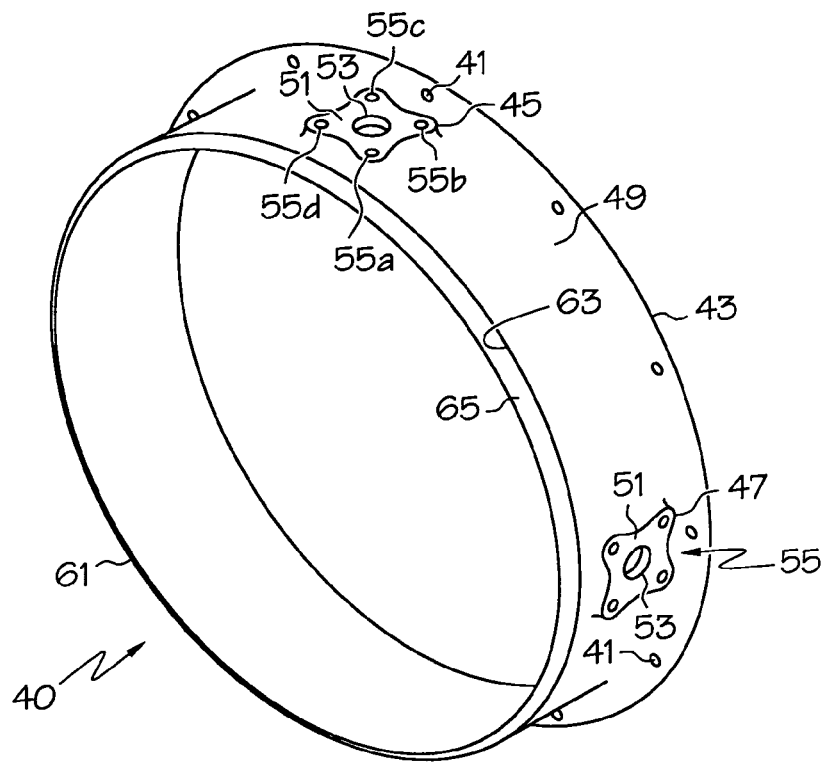
FIG. 4 is a perspective detail view of the load ring of FIG. 3, according to the present invention.

As shown in FIG. 4, the load ring 40 may include load ring pads 45 and 47 disposed on the outboard load ring surface 49. Each load ring pad 45 and 47 may comprise a cloverleaf-shaped mounting surface 51, preferably a machined surface, positioned radially outward of the outboard load ring surface 49. Each mounting surface 51 may thus comprise a raised region having a thickness and a structural strength greater than the surrounding region of the load ring 40. Each mounting surface 51 may further define a plane normal to a radius of the load ring 40.

The load ring pads 45 and 47 may be formed integral with the load ring 40, or may comprise separate components attached to the load ring 40 by welding, for example. The circumferential and axial position and orientation of the load ring pad 45 and the load ring pad 47 may be determined by design parameters and structural requirements as is well-known in the relevant art. Each load ring pad 45 and 47 may have a bearing hole 53 therethrough. Bearing hole 53 may be adapted to receive the stud adapter 23 (see, FIG. 2). Each load ring pad 45 and 47 may comprise a four-bolt hole pattern 55, comprising bolt holes 55a-55d, located on the respective mounting surfaces 51 to receive threaded fasteners (not shown). The load ring 40 may also include a stepped edge 61 formed by a shoulder 63 and a cylindrical lip 65 extending along the circumference of the load ring 40, where the diameter of the cylindrical lip 65 is smaller than the diameter of the outboard load ring surface 49.

Figure 5:
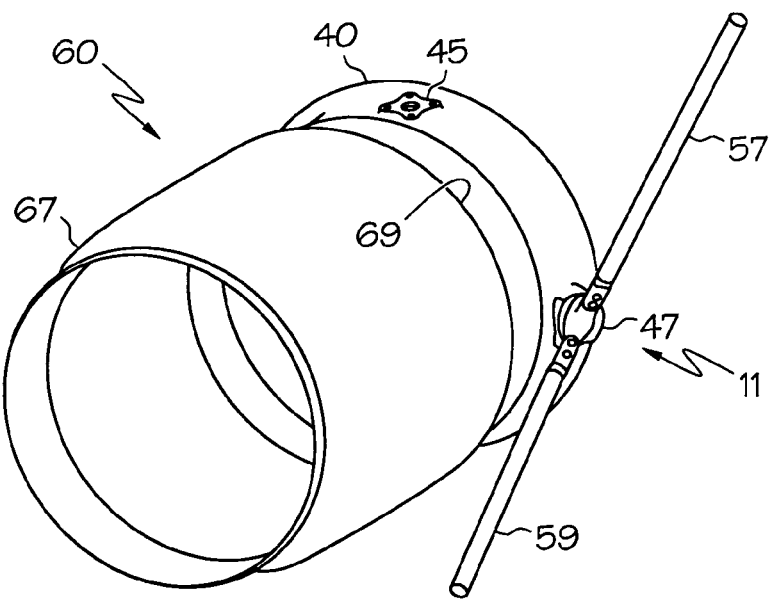
FIG. 5 is a perspective view of the load ring of FIG. 3 supporting an inlet duct and secured to a flight vehicle via mounting struts, according to the present invention.

As shown in FIG. 5, mounting of the load ring 40 may include attaching a first strut 57 and a second strut 59 to the load ring pad 47 by means of the standard cloverleaf strut mounting assembly 11. The distal ends of the first strut 57 and the second strut 59 may be attached to the airframe of the aircraft (not shown) or to a similar structure. Similarly, additional struts or links (not shown for clarity of illustration) may be provided to further secure the load ring pad 45 to the aircraft structure. The load ring 40 thus serves to support the auxiliary power unit 35 (not shown in FIG. 5 for clarity of illustration) via the APU shroud 37.

Alternatively, the load ring 40 may be attached to the first strut 57 and the second strut 59 by mating with a yoke (not shown) on the first strut 57 or the second strut 59. The mechanical attachment member may comprise a lug, as described in greater detail below, to mate with the yoke on the first strut 57 or the second strut 59. In another embodiment, the mechanical attachment member may comprise a universal joint yoke to mate with a universal joint yoke and a universal joint spider on the first strut 57 or the second strut 59.

Again with reference to FIG. 5, an inlet duct 67 may be secured to the stepped edge 61 of the load ring 40, where the cylindrical lip 65 extends into the inlet duct 67 and the shoulder 63 abuts against an aft duct edge 69 of the inlet duct 67. Accordingly, the outer diameter of the cylindrical lip 65 may be substantially the same as the inner diameter of the aft duct edge 69. The inlet duct 67 may be attached to the load ring 40 with mechanical fasteners, with deformable fasteners such as rivets, by welding, by bonding with a bonding agent, by brazing, or any other suitable means known in the relevant art. The combination of the inlet duct 67 and the load ring 40 may form an integrated mount duct 60 to provide a flowpath for delivering outside air to the auxiliary power unit 35. The inlet duct 67 may also include acoustic treatment (not shown), as well known in the relevant art, to provide noise attenuation. The size of the load ring 40, and of the integrated mount duct 60, may be determined by the structural support requirements and the air flow requirements of the auxiliary power unit 35.

The pattern of the flange holes 41 and the specifications of the fasteners used to secure the load ring 40 to the APU shroud 37 can be determined by the support requirements of the auxiliary power unit 35. In an alternative embodiment, a third load ring pad (not shown) may be included on the outboard surface 49 of the load ring 40 to mate with a strut mounting assembly 11 (not shown) and provide additional support for the auxiliary power unit 35. It can be appreciated that the load ring 40 may function to transfer support loads between the auxiliary power unit 35 and the aircraft structure via the load ring pads 45 and 47 and, if present, additional load ring pads. It should also be understood that the load ring 40 may be used in a reversed configuration (not shown) in which the mount flange edge 43 faces forward to mate with a cylindrical turbomachine component (not shown).

Figure 6:
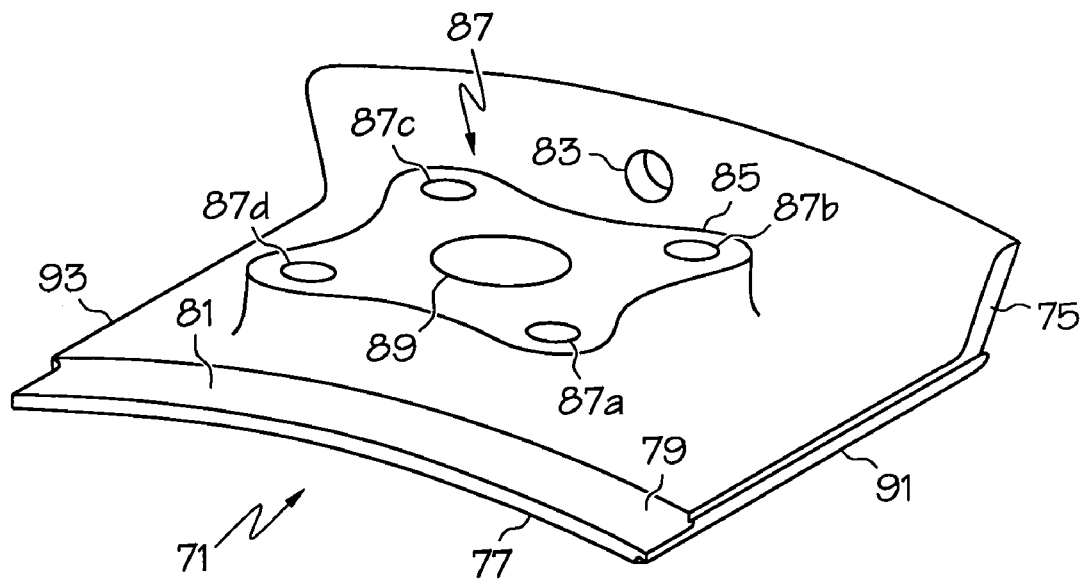
FIG. 6 is a detail perspective view of a ring pad flange sector used in the construction of an embodiment of a sectored load ring, according to the present invention.
Figure 7:
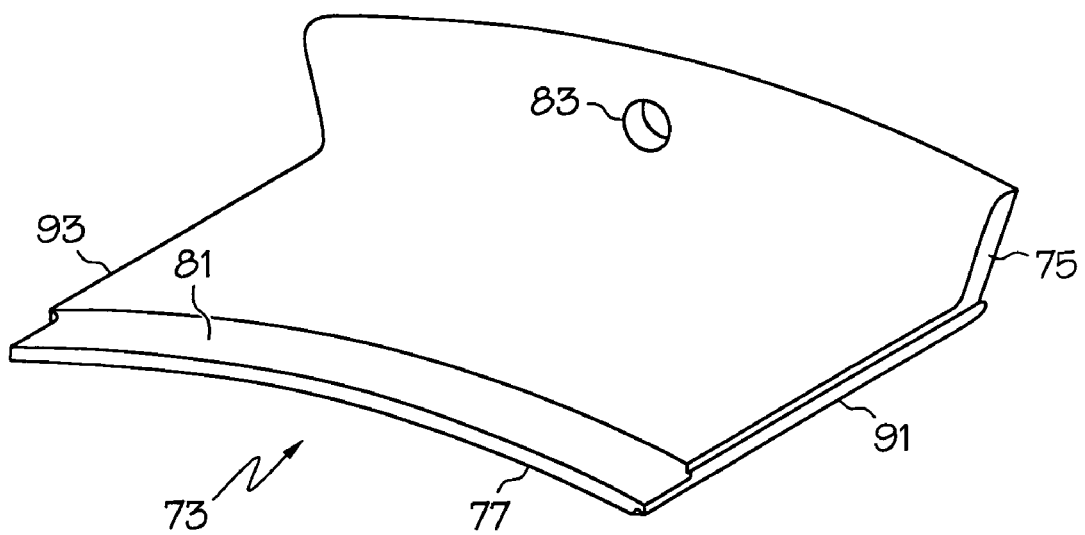
FIG. 7 is a detail perspective view of a ring blank flange sector for use in conjunction with the ring pad flange of FIG. 6 in the construction of an embodiment of a sectored load ring, according to the present invention.

In an alternative embodiment, a modular load ring may be fabricated using one or more arc-shaped ring bearing flange sectors such as ring pad flange sectors 71, shown in FIG. 6, and a plurality of arc-shaped ring blank flange sectors 73, shown in FIG. 7. Each of the ring pad flange sectors 71 and the ring blank flange sectors 73 may include a sector mount flange edge 75 and may include a sector stepped edge 77 with a sector lip 79 and a sector shoulder 81. Each of the ring pad flange sectors 71 and the ring blank flange sectors 73 may also include a sector flange hole 83 for insertion of fasteners for connection to the APU shroud 37.

Figure 1:
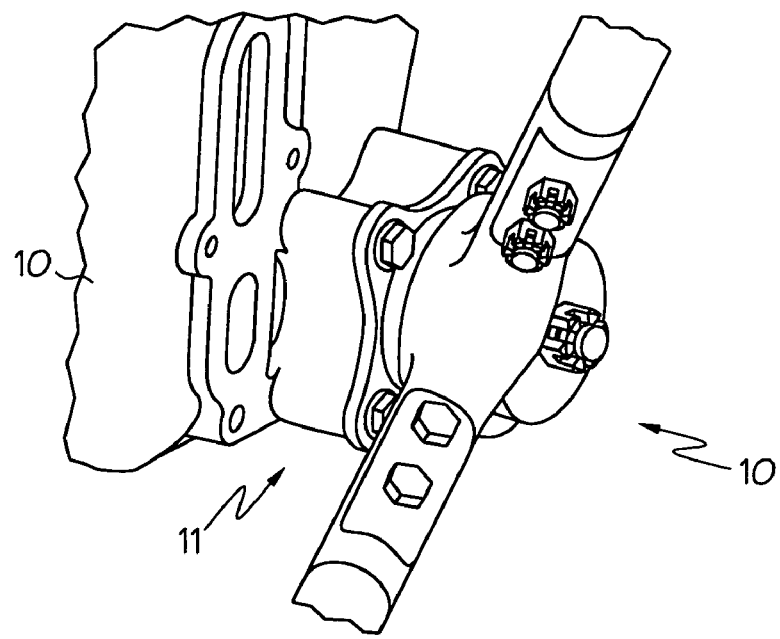
FIG. 1 is a perspective view of a conventional cloverleaf structure used for mounting ancillary equipment to a flight vehicle, according to the prior art.
Figure 2:
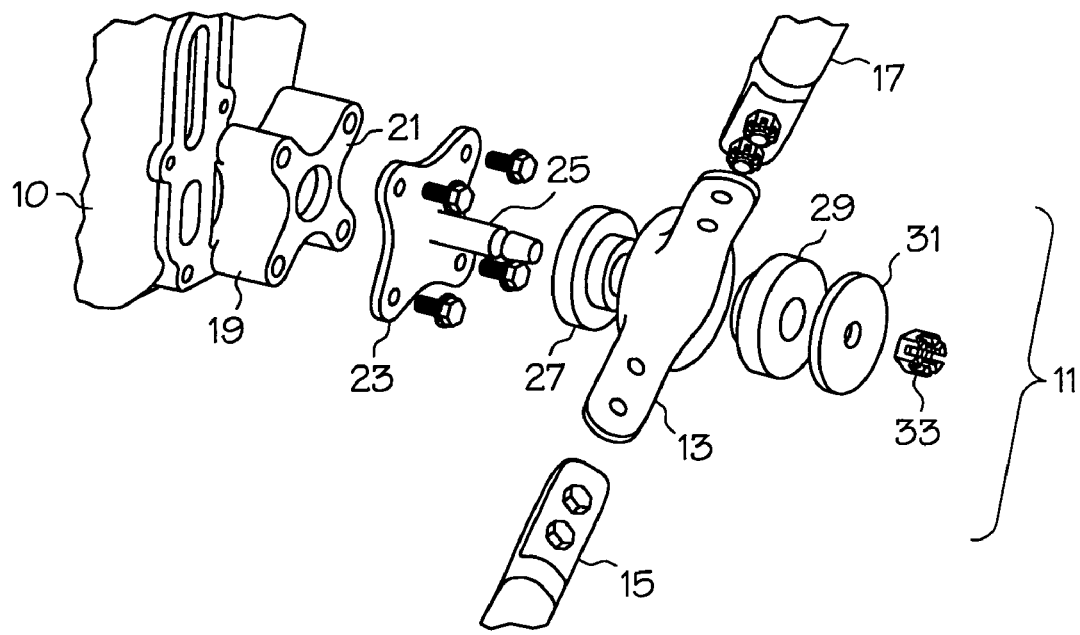
FIG. 2 is an exploded perspective view of the conventional cloverleaf structure of FIG. 1.

The ring pad flange sector 71 may be substantially similar in shape and size to the ring blank flange sector 73, but ring pad flange sector 71 may also include a raised cloverleaf pad 85 comprising a four-bolt hole pattern 87, with bolt holes 87*a* to 87*d*, to receive threaded fasteners and a bearing hole 89 to receive the stud adapter 23 (shown in FIG. 2).

Figure 8:
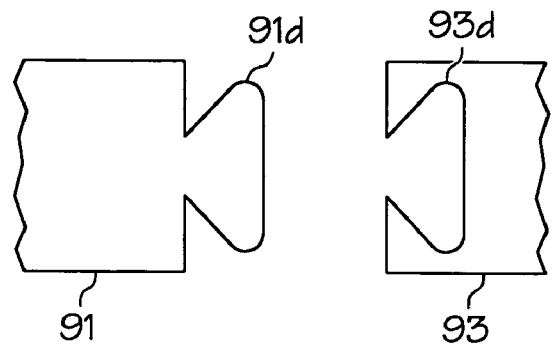
FIG. 8 is a detail view of an interlocking feature used to join the ring pad flange sector of FIG. 6 and the ring blank flange sector of FIG. 7 in the construction of an embodiment of a sectored load ring, according to the present invention.
Figure 9:
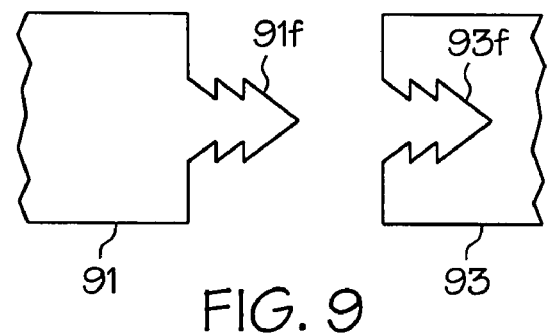
FIG. 9 is a detail view of an alternative embodiment of an interlocking feature used to join the ring pad flange sector of FIG. 6 and the ring blank flange sector of FIG. 7, according to the present invention.
Figure 10:
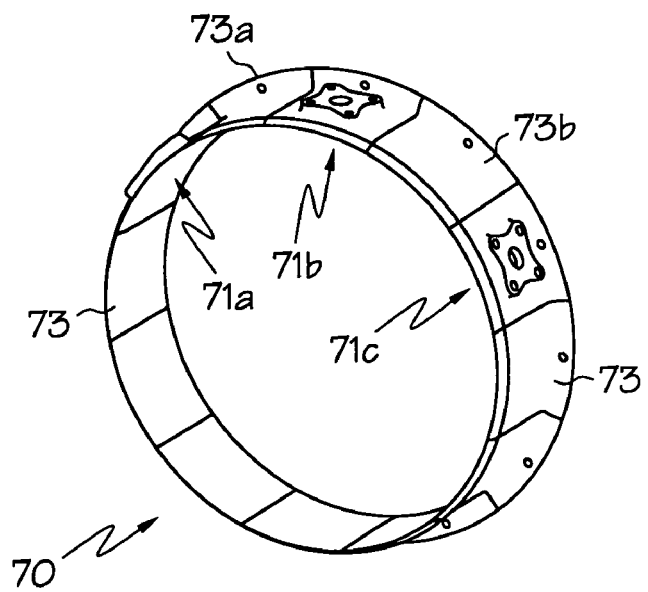
FIG. 10 is a perspective view of a sectored load ring, according to another embodiment of the present invention.

The ring pad flange sector 71 may include a first axial edge 91 with an interlocking male dovetail form 91*d*, shown in cross section in FIG. 8. The ring pad flange sector 71 may also include a second axial edge 93 with an interlocking female dovetail form 93*d*, shown in cross section in FIG. 8, configured to interlock with the male form 91*d* of the first axial edge 91 of an adjacent sector component. The ring blank flange sector 73 may also include similar interlocking male and female dovetail forms 91*d* and 93*d* along first and second axial edges 91 and 93, respectively. Alternatively, the first axial edge 91 may include an interlocking male fir tree form 91*f*, and the second axial edge 93 may include an interlocking female fir tree form 93*f*, as shown in FIG. 9. Accordingly, one or more ring pad flange sectors 71 and a plurality of ring blank flange sectors 73 can be interlocked to form a sectored load ring 70, shown in FIG. 10.

In the configuration shown, the sectored load ring 70 may comprise three ring pad flange sectors 71*a-c* and two ring blank flange sectors 73*a-b* arranged such that the ring blank flange sector 73*a* is joined to the ring pad flange sectors 71*a* and 71*b*, and the ring blank flange sector 73*b* is joined to the ring pad flange sectors 71*b* and 71*c*. Nine additional ring blank flange sectors 73 may be disposed between the ring pad flange sectors 71*c* and 71*a* such that the sectored load ring may comprise a total of twelve ring flange sectors, each ring flange sector spanning an arc of approximately 30°. Accordingly, in the example provided, the ring pad flange sector 71*b* may be circumferentially spaced from the ring pad flange sector 71*a* by an angle of approximately 60°, and the ring pad flange sector 71*c* may be circumferentially spaced from the ring pad flange sector 71*b* by an angle of approximately 60°. However, it should be understood that the invention is not limited to a combination of sector components each spanning a 30° arc, but may include combinations of ring blank flange sectors 73 and ring pad flange sectors 71 which may span arcs of different sizes and combine to form a complete circular load ring extending 360°.

Figure 11:
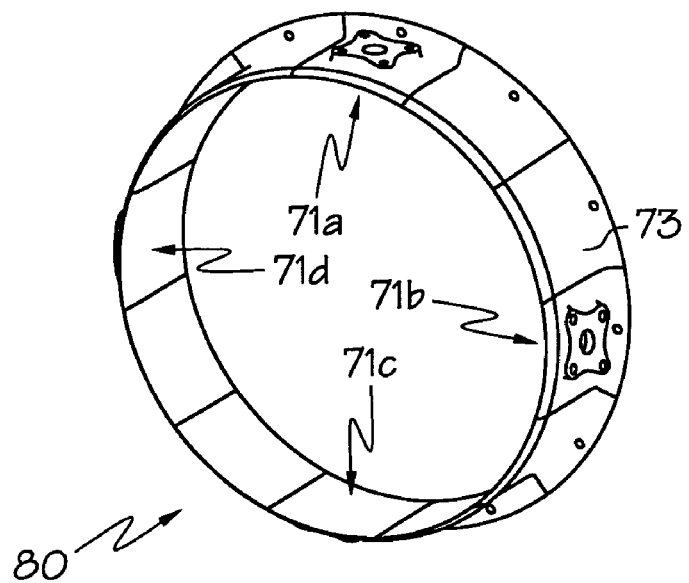
FIG. 11 is a perspective view of an alternative embodiment of a sectored load ring, according to the present invention.

In another embodiment, shown in FIG. 11, a sectored load ring 80 may comprise four ring pad flange sectors 71*a-d* and eight ring blank flange sectors 73 arranged such that two ring blank flange sectors 73 can be disposed between the ring pad flange sector 71*a* and the ring pad flange sector 71*b*, a further two ring blank flange sectors 73 may be disposed between the ring pad flange sector 71*b* and the ring pad flange sector 71*c*, a further two ring blank flange sectors 73 may be disposed between the ring pad flange sector 71*c* and the ring pad flange sector 71*d*, and a further two ring blank flange sectors 73 may be disposed between the ring pad flange sector 71*d* and the ring pad flange sector 71*a*. Accordingly, in the example provided, the ring pad flange sectors pairs 71*a* and 71*b*, 71*b* and 71*c*, 71*c* and 71*d*, and 71*d* and 71*a* may be disposed approximately 90° from each other.

Figure 12:
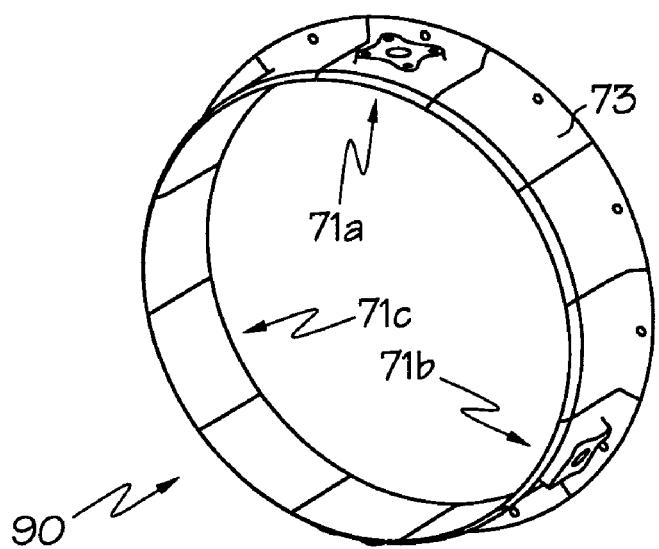
FIG. 12 is a perspective view of another alternative embodiment of a sectored load ring, according to the present invention.

In yet another embodiment, shown in FIG. 12, a sectored load ring 90 may comprise three ring pad flange sectors 71*a-c* and nine ring blank flange sectors 73 arranged such that three ring blank flange sectors 73 can be disposed between the ring pad flange sector 71*a* and the ring pad flange sector 71*b*, a further three ring blank flange sectors 73 may be disposed between the ring pad flange sector 71*b* and the ring pad flange sector 71*c*, and a further three ring blank flange sectors 73 may be disposed between the ring pad flange sector 71*c* and the ring pad flange sector 71*a*. Accordingly, in the example provided, the ring pad flange sectors pairs 71*a* and 71*b*, 71*b* and 71*c*, and 71*c* and 71*d* may be circumferentially spaced from each other by an angle of approximately 120°.

Figure 13:
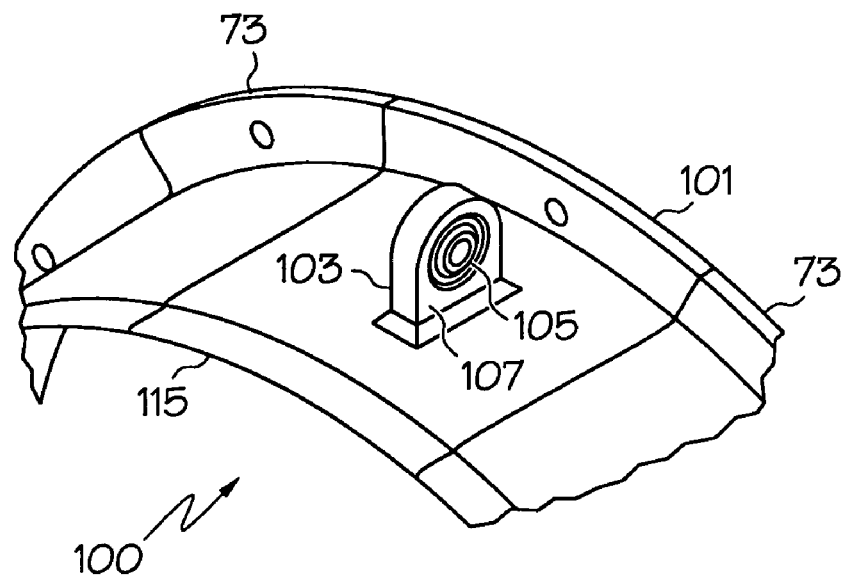
FIG. 13 is a perspective view of an embodiment of an axial finger with a spherical bearing, the axial finger disposed on a sectored load ring, according to the present invention.

One or more of the ring pad flange sectors 71 in the load rings 70, 80, or 90, above, may be replaced by an axial finger sector 101 to form a sectored load ring 100, partially shown in FIG. 13. The axial finger sector 101 may be substantially similar in configuration to the ring blank flange sector 73, but the axial finger sector 101 may include an axial finger 103 with an enclosed spherical bearing 105 positioned to mate with a strut or link (not shown) without requiring a standard cloverleaf strut mounting assembly 11 (FIG. 2). The axial finger 103 may have an axial finger face 107.

In alternative embodiments of the present invention, the axial finger face 107 may be oriented in various directions with respect to the sectored load ring 100. For example, in various alternative embodiments, the finger face 107 may be: oriented longitudinally, as shown in FIG. 13; oriented radially (not shown) along a circumference of the sectored load ring 100; or oriented at an intermediate angle (also not shown) between a longitudinal orientation and a radial orientation. That is, the finger face 107 may be oriented at an angle of from 0° to 90° with respect to a sector edge 115, where the sector edge 115 may be a stepped edge as shown.

Figure 14:
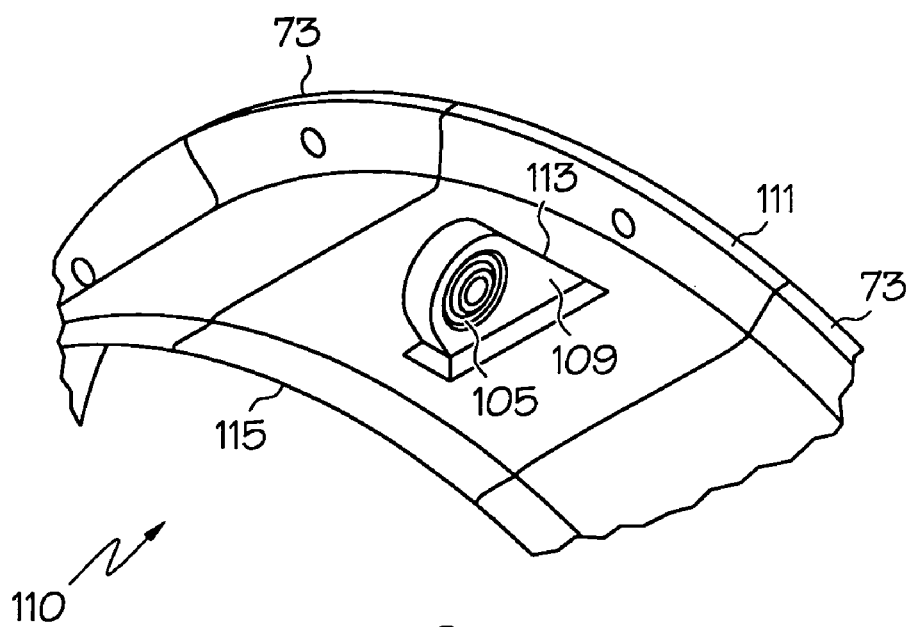
FIG. 14 is a perspective view of an alternative embodiment of an angled axial finger with a spherical bearing, the axial finger disposed on a sectored load ring, according to another embodiment of the present invention.

In yet another embodiment, shown in FIG. 14, one or more of the ring pad flange sectors 71 in the load rings 70, 80, or 90, above, may be replaced by an angled axial finger sector 111 to form a sectored load ring 110, partially shown in FIG. 14. The angled axial finger sector 111 may be substantially similar in configuration to the ring blank flange sector 73 but may include an angled axial finger 113 enclosing the spherical bearing 105. An angled axial finger face 109 on the angled axial finger 113 may be oriented at an angle of from 0° to 90° with respect to the sector edge 115.

Figure 15:
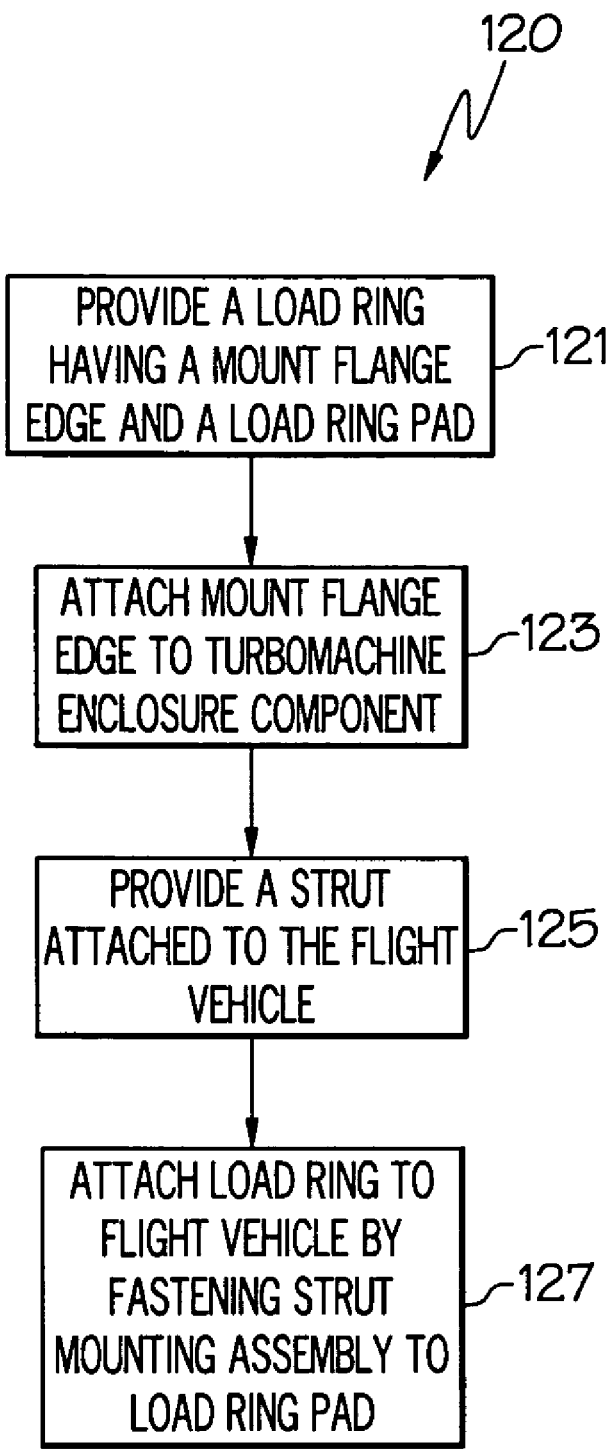
FIG. 15 is a flowchart showing a method of attaching a turbomachine to a flight vehicle.

The above-described embodiments may be produced following a method provided by a flow diagram 120 in FIG. 15. A load ring may be provided, such as load ring 40, where the load ring may have a mount flange edge, such as the mount flange edge 43, and a load ring pad, such as the load ring pad 45, at step 121. The mount flange edge 43 may be attached to a turbomachine enclosure component, such as the APU shroud 37, at step 123. A strut, such as the first strut 57, may be attached to the flight vehicle, at step 125. The load ring 40 may then be attached to the flight vehicle by fastening a strut mounting assembly, such as the strut mounting assembly 11, to the load ring pad 45 using mechanical fasteners, at step 127.

It should be understood, of course, that the foregoing relates to exemplary embodiments of the invention and that modifications may be made without departing from the spirit and scope of the invention as set forth in the following claims.

I claim:

1. A turbomachine suitable for mounting on a structure, said turbomachine comprising:
    a turbine;
    a strut mounting assembly;
    a strut having a proximal end connected to said strut mounting assembly and a distal end connected to the structure;
    a sectored load ring having a cylindrical shape and at least one sectored load ring pad disposed on an outside surface of said load ring, said sectored load ring pad configured to mate with said strut mounting assembly, and said sectored load ring comprising three or more ring flange sectors each having two axial edges, each of said ring flange sectors connected together radially in sequence in an orthogonal plane relative to a longitudinal axis by means of interlocking said axial edges, each of said axial edges configured to mate with an axial edge of another ring flange sector; and
    an inlet duct enclosing said turbine, said inlet duct attached to said load ring.

2. The turbomachine of claim 1 wherein said sectored load ring comprises twelve ring flange sectors each having two axial edges.

3. The turbomachine of claim 2 wherein said sectored load ring comprises at least one ring pad flange sector and at least eight ring blank flange sectors.

4. The turbomachine of claim 1 wherein said sectored load ring pad comprises a cloverleaf shaped mounting surface.

5. The turbomachine of claim 1 wherein said sectored load ring pad comprises a mounting surface defining a plane normal to a radius of said load ring.

6. The turbomachine of claim 1 wherein said sectored load ring pad comprises a plurality of bolt holes configured to mate with a standard stud adapter.

7. A method of attaching a turbomachine to a structure, said method comprising the steps of:
    attaching a sectored load ring to a turbomachine comprising a turbomachine enclosure component, said sectored load ring having a mount flange edge for mating with said enclosure component and comprising three or more ring flange sectors each having two axial edges, each of said ring flange sectors connected together radially in sequence in an orthogonal plane relative to a longitudinal axis by means of interlocking said axial edges, each of said axial edges configured to mate with an axial edge of another ring flange sector;
    providing at least one strut attached to the structure; and
    attaching said sectored load ring to the structure using a strut mounting assembly attached to said at least one strut, said sectored load ring having a first mechanical attachment member disposed on an external circumference of said sectored load ring and fastened to said strut mounting assembly.

8. The method of claim 7 wherein said first mechanical attachment member comprises a mounting surface defining a plane normal to a radius of said sectored load ring.

9. The method of claim 7 wherein said sectored load ring comprises a second mechanical attachment member, said second mechanical attachment member circumferentially spaced from said first mechanical attachment member by an angle of from approximately 60° to 120°.

10. The method of claim 7 wherein said first mechanical attachment member comprises a cloverleaf shaped mounting surface having a four-bolt hole pattern and a bearing hole configured to mate with a stud adapter.

11. The method of claim 7 wherein said sectored load ring is attached to an inlet duct.

* * * * *